UNITED STATES PATENT OFFICE.

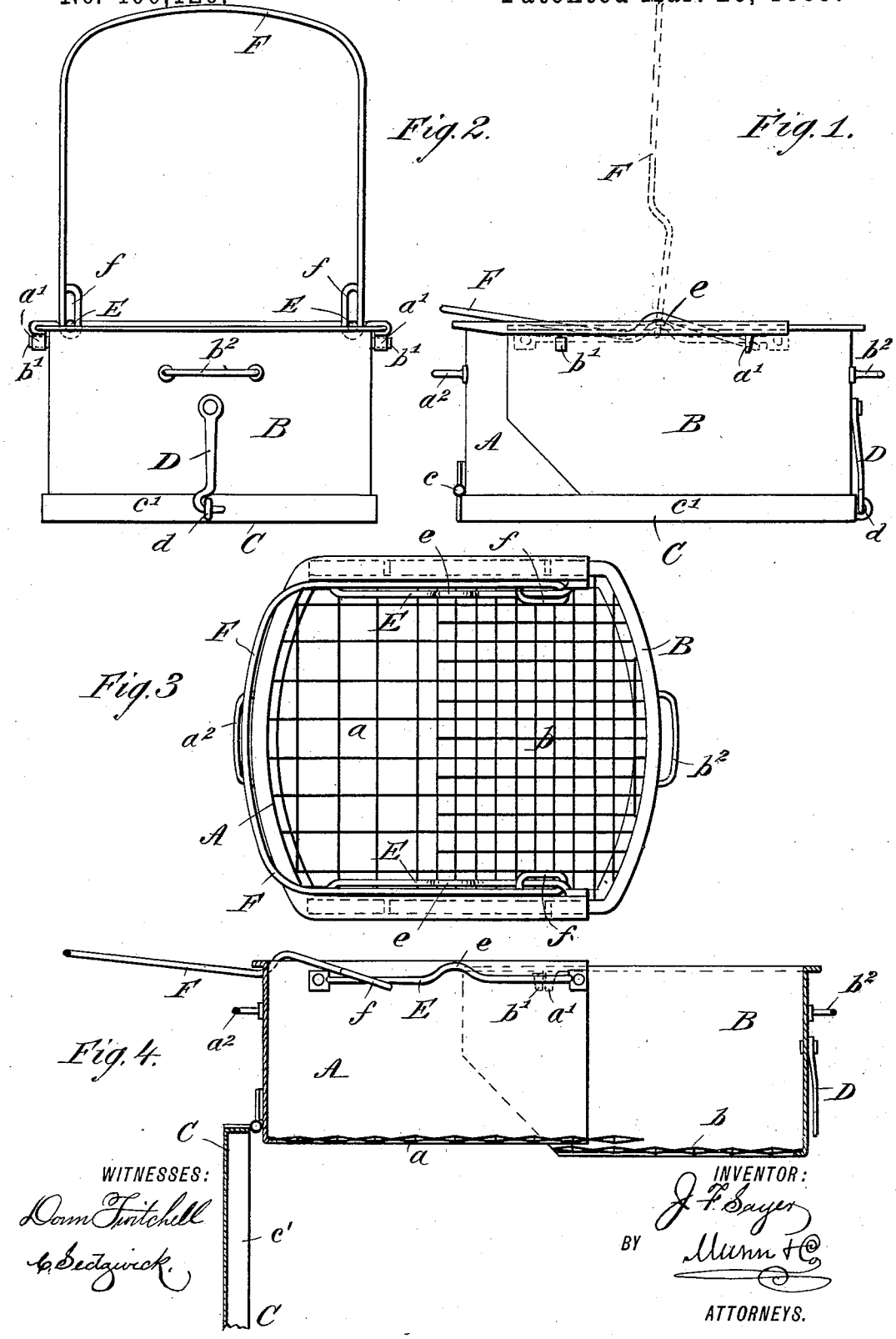

JAMES F. SAYER, OF GOUVERNEUR, NEW YORK.

COMBINED ASH PAN AND SIFTER.

SPECIFICATION forming part of Letters Patent No. 400,120, dated March 26, 1889.

Application filed January 21, 1889. Serial No. 296,986. (No model.)

*To all whom it may concern:*

Be it known that I, JAMES F. SAYER, of Gouverneur, in the county of St. Lawrence and State of New York, have invented a new and Improved Combined Ash Pan and Sifter, of which the following is a full, clear, and exact description.

My invention relates to a combined ash pan and sifter device intended more particularly for use under the grates of stoves for catching the ashes to be sifted; and the invention has for its object to provide a simple, inexpensive, and durable device of this character, by which coal-ashes may be safely carried and effectively sifted in a cleanly manner.

The invention consists in certain novel features of construction and combinations of parts of the ash pan and sifter, all as hereinafter described and claimed.

Reference is to be had to the accompanying drawings, forming a part of this specification, in which similar letters of reference indicate corresponding parts in all the figures.

Figure 1 is a side elevation of the ash pan and sifter as adjusted for receiving ashes, and with the bail or handle raised in dotted lines, as when carrying the device. Fig. 2 is an outer end view of the pan and sifter with the bail raised. Fig. 3 is a plan view of the device; and Fig. 4 is a central longitudinal vertical section of the pan and sifter as adjusted for sifting the ashes, but with the lowered bottom pan partly broken away.

This ash pan and sifter device consists, mainly, of two telescoping sifter-sections, A B, provided, respectively, with wire-screen bottoms, $a$ $b$, and a bottom pan or plate, C, made imperforate to temporarily retain the ashes, and preferably hinged at one end to the end of one telescoping screen-section— the one A, as shown in the drawings. The screen-sections A B are made practically alike, or with a ⊃-shaped vertical frame of suitable depth and length, to which the screen-bottom is held by soldering, riveting, clamping, or otherwise. Each of these sections preferably has a stiffening marginal flange turned over at the top of its frame, and the frame of section A has side flanges formed as grooved ways, into which the side flanges of the frame of section B fit loosely, whereby one section may slide on the other to expand or contract the sifter. The section A is provided at its opposite flanged ways or guides with stops $a'$, against which lugs $b'$ on the sifter-section B strike to limit the expansion of the sections, which are provided with handles $a^2$ $b^2$ at their outer ends for convenience in handling or operating the device.

The imperforate bottom C is hinged at one end to the end of the section A, as shown at $c$ in the drawings, and at its other end the bottom is provided with an eye or staple, $d$, which may be engaged by a hook, D, on the section B when the sections are telescoped or contracted and the bottom pan is closed to them. The sifter-bottom preferably has an upturned marginal flange, $c'$, all around it, to overlap the frames of the sections A B and prevent spilling or falling of ashes from the device when the bottom is closed and the ashes are being carried to the place where they are to be sifted.

The section A is provided at each side with a rod, E, the extremities of which are bent outward to cause its longer central part to stand off from the sifter-frame sufficiently to receive an eye, $f$, at the end of the bail or handle F of the device. Both the bail-rods E are bent upward at the center to provide offsets or notches at $e$, into which the sliding bail-eyes $f$ may be set for carrying the ash-filled device conveniently and safely, said offsets $e$ being about at the lengthwise center of the closed sifter to balance it nicely on the bail.

The operation of the device is very simple and effective, as follows: When the sifter is contracted and its bottom pan is closed and hooked or latched and the bail F is pushed fully inward, all as shown in full lines in Figs. 1 and 3 of the drawings, the device will be placed under the grate of a stove, and when it is filled with ashes fallen through the grate the ash-pit doors of the stove will be opened, and the bail F will be grasped and drawn outward until its eyes $f$ rest at the notches $e$ of the bail-rods E, whereupon the entire device, with its load of ashes, may be safely carried by the bail to where the ashes are to be sifted. Arriving there, the operator will first disengage the hook D from the eye $d$, which will allow the bottom pan, C, to swing down on its hinge $c$ to vertical position, and the sifter-sections A B will then be fully expanded by drawing on their handles $a^2$ $b^2$, and the down-swung imperforate bottom pan will then serve as a shield or guard against ashes to the clothing of the operator while the device is shaken endwise to sift the ashes from the cinders or partly-burnt coals, and, if desired, the device may be partly sustained from the ground or floor by resting the outer or lower end of the bottom pan thereon to serve as a fulcrum on which to rock or oscillate the sifter. It requires but a few moments' time to discharge the sifted cinders and contract the two sifter-sections A B and swing up and hook the bottom C, and the device is then ready to be replaced in the stove beneath the grate.

The pan and sifter may be used independently of a stove; but I have specially designed it for use in the ash-pits of stoves. It will be noticed that the expansibility of the sifter allows it to be entirely filled with ashes, while causing the ashes to settle down upon and through a largely-increased bottom screening-surface, $a$ $b$, when the sections A B are expanded, thus allowing quick, easy, and effective carriage and sifting of the ashes, whether the device be partly or wholly full when taken from the stove.

Having thus described my invention, what I claim as new, and desire to secure by Letters Patent, is—

1. A combined ash pan and sifter consisting of two telescoping sections having overlapping screen-bottoms and an imperforate bottom pan held thereto to temporarily retain the ashes, substantially as herein set forth.

2. A combined ash pan and sifter consisting of two telescoping sections having overlapping screen-bottoms, lugs or stops on the sections limiting their extensibility, and an imperforate bottom pan held to the sections to temporarily retain the ashes, substantially as herein set forth.

3. A combined ash pan and sifter consisting of two telescoping sections having overlapping screen-bottoms, an imperforate bottom pan hinged to one section, and a latch device for the bottom pan when closed to the contracted sections, substantially as herein set forth.

4. The combination, in an ash pan and sifter, of two telescoping sections having overlapping screen-bottoms, an imperforate bottom hinged to one section and provided at its free end with an eye, $d$, and a hook, D, on the other section for securing the closed bottom pan to the contracted sifter-section, substantially as herein set forth.

5. The combination, in an ash pan and sifter, of two telescoping sections, A B, having overlapping screen-bottoms, an imperforate bottom pan held to said sections to temporarily retain the ashes, said section A having side rods, E, provided with offsets $e$, and a bail, F, fitted loosely on said rods and adapted to their offsets, substantially as herein set forth.

JAMES F. SAYER.

Witnesses:
E. W. ABBOTT,
FRED B. FULLER.